United States Patent
Schwarz et al.

(10) Patent No.: US 10,496,155 B2
(45) Date of Patent: Dec. 3, 2019

(54) VIRTUAL REALITY FLOOR MAT ACTIVITY REGION

(71) Applicant: Microsoft Technology Licensing, LLC, Redmond, WA (US)

(72) Inventors: Julia Schwarz, Redmond, WA (US); Jason Michael Ray, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/943,532

(22) Filed: Apr. 2, 2018

(65) Prior Publication Data

US 2019/0302879 A1 Oct. 3, 2019

(51) Int. Cl.
*G06F 3/01* (2006.01)
*H04N 13/344* (2018.01)
*G06F 3/041* (2006.01)
*G02B 27/01* (2006.01)
*G06T 7/73* (2017.01)
*G06N 20/00* (2019.01)

(52) U.S. Cl.
CPC ............ *G06F 3/011* (2013.01); *G02B 27/017* (2013.01); *G06F 3/016* (2013.01); *G06F 3/0414* (2013.01); *G06N 20/00* (2019.01); *G06T 7/73* (2017.01); *H04N 13/344* (2018.05); *G02B 2027/014* (2013.01); *G02B 2027/0138* (2013.01)

(58) Field of Classification Search
CPC ........ G06F 3/011; G06F 3/016; G06F 3/0414; G06F 15/18; G06T 7/73; H04N 13/344; G02B 27/017; G02B 2027/0138; G02B 2027/014

USPC ......................................................... 345/156
See application file for complete search history.

(56) References Cited

U.S. PATENT DOCUMENTS 7,387,592 B2 * 6/2008 Couvillion, Jr. .. A61M 16/0465
                                                              482/51
9,744,448 B2    8/2017 Mullen
(Continued)

OTHER PUBLICATIONS

"Freedom Locomotion VR on Steam. Fully Rift + Touch Compatible now", Retrieved from <<https://www.reddit.com/r/oculus/comments/5z5frb/freedom_locomotion_vr_on_steam_fully_rift_touch/>>, Retrieved on: Feb. 27, 2018, 21 Pages.

(Continued)

*Primary Examiner* — Jennifer Mehmood
*Assistant Examiner* — Ngan T Pham Lu
(74) *Attorney, Agent, or Firm* — Alleman Hall Creasman & Tuttle LLP

(57) ABSTRACT

A virtual reality experience is provided to one or more users by a computing system through the use of a special-purpose virtual reality mat. The computing system receives image data from an optical sensor imaging a physical environment. The mat includes one or more fiducial markers that are recognizable by the computing system. A presence of these fiducial markers is detected based on the image data. An activity region within the physical environment is defined based, at least in part, on the detected fiducial markers. A positioning of a physical subject is identified within the physical environment relative to the activity region. The virtual reality experience is selectively augmented based on the positioning of the physical subject identified relative to the activity region.

20 Claims, 5 Drawing Sheets

(56) References Cited

U.S. PATENT DOCUMENTS

| | | | |
|---|---|---|---|
| 2014/0214481 A1* | 7/2014 | Argue | G06Q 30/0261 |
| | | | 705/7.29 |
| 2017/0090578 A1* | 3/2017 | Keller | G06F 3/016 |
| 2018/0021670 A1* | 1/2018 | Price, Jr. | A63F 13/214 |
| | | | 463/36 |
| 2018/0143025 A1* | 5/2018 | Kurata | G01C 21/26 |

OTHER PUBLICATIONS

"Kinect Make Your Carpet Interactive", Retrieved from: <<https://web.archive.org/web/20160703095321/http:/x-tech.am/kinect-make-your-carpet-interactive/>>, Jul. 3, 2016, 6 Pages.

Bruce, James, "How to Set Up the Perfect VR Room", Retrieved from <<https://www.makeuseof.com/tag/perfect-virtual-reality-room-setup/>>, May 2, 2017, 22 Pages.

Holly, Russell, "How to set up your Windows Mixed Reality playspace", Retrieved from <<https://www.windowscentral.com/how-set-your-windows-mixed-reality-playspace>>, Aug. 21, 2017, 8 Pages.

Metz, Rachel, "Bring Your Feet into Virtual Reality", Retrieved from <<https://www.technologyreview.com/s/600854/bring-your-feet-into-virtual-reality/>>, Feb. 22, 2016, 7 Pages.

O'Donnell, Andy, "Tips for Creating a Virtual Reality Room", Retrieved from <<https://www.lifewire.com/create-a-virtual-reality-room-4121179>>, Retrieved on: Feb. 7, 2018, 22 Pages.

\* cited by examiner

VIRTUAL REALITY FLOOR MAT ACTIVITY REGION

BACKGROUND

Virtual reality is typically achieved in the visual domain through the use of graphical displays that occlude a user's view of the surrounding physical environment. Head-mounted display (HMD) devices utilizing fully occluding near-eye graphical displays may be used to provide a fully immersive virtual reality experience. HMD devices may include a forward-facing camera that captures the surrounding physical environment from the viewpoint of the user. The forward-facing camera and other on-board sensors enables the positioning of the HMD device to be tracked within the physical environment, which may be mapped to a virtual viewpoint for the user in a virtual environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A virtual reality experience is provided to one or more users by a computing system through the use of a special-purpose virtual reality mat. The computing system receives image data from an optical sensor imaging a physical environment. The optical sensor may take the form of a camera that is located on-board a head-mounted display (HMD) device or at a remote fixed location, for example. The mat includes one or more fiducial markers or other physical features that are recognizable by the computing system. A presence of these fiducial markers or other physical features is detected based on the image data. An activity region within the physical environment is defined based, at least in part, on the detected fiducial markers or other physical features. A positioning of a physical subject is identified within the physical environment relative to the activity region. The physical subject may include a user or a device carried by or mounted upon the user, such as an HMD device, a handheld controller, etc. The virtual reality experience for the user is selectively augmented based on the positioning of the physical subject identified relative to the activity region. For example, a notification of a user's proximity to a boundary of the activity region may be provided to the user through visual, auditory, or haptic feedback.

DETAILED DESCRIPTION

An activity region is defined within a physical environment for one or more virtual reality sessions. A positioning of a user or the user's device relative to the activity region may be tied to notifications that are presented to the user during a virtual reality session. The notifications may inform the user that she or he is approaching a boundary of the activity region, thereby enabling the user to avoid physical obstacles that may be present within the surrounding physical environment.

The activity region may be defined in relation to one or more physical features of a special-purpose virtual reality mat or other physical object having a fiducial marker that is recognizable by the virtual reality system via one or more optical sensors. Machine-vision algorithms may be previously trained using supervised machine learning with training images of the physical features as input to enable the presence of such features to be detected within image data. Non-visual techniques for defining an activity region are also disclosed, including user-assisted initialization in which the activity region is defined in relation to an initial reference location and/or orientation of a user or user's device without necessarily requiring the use of optical sensors.

Figure 1:
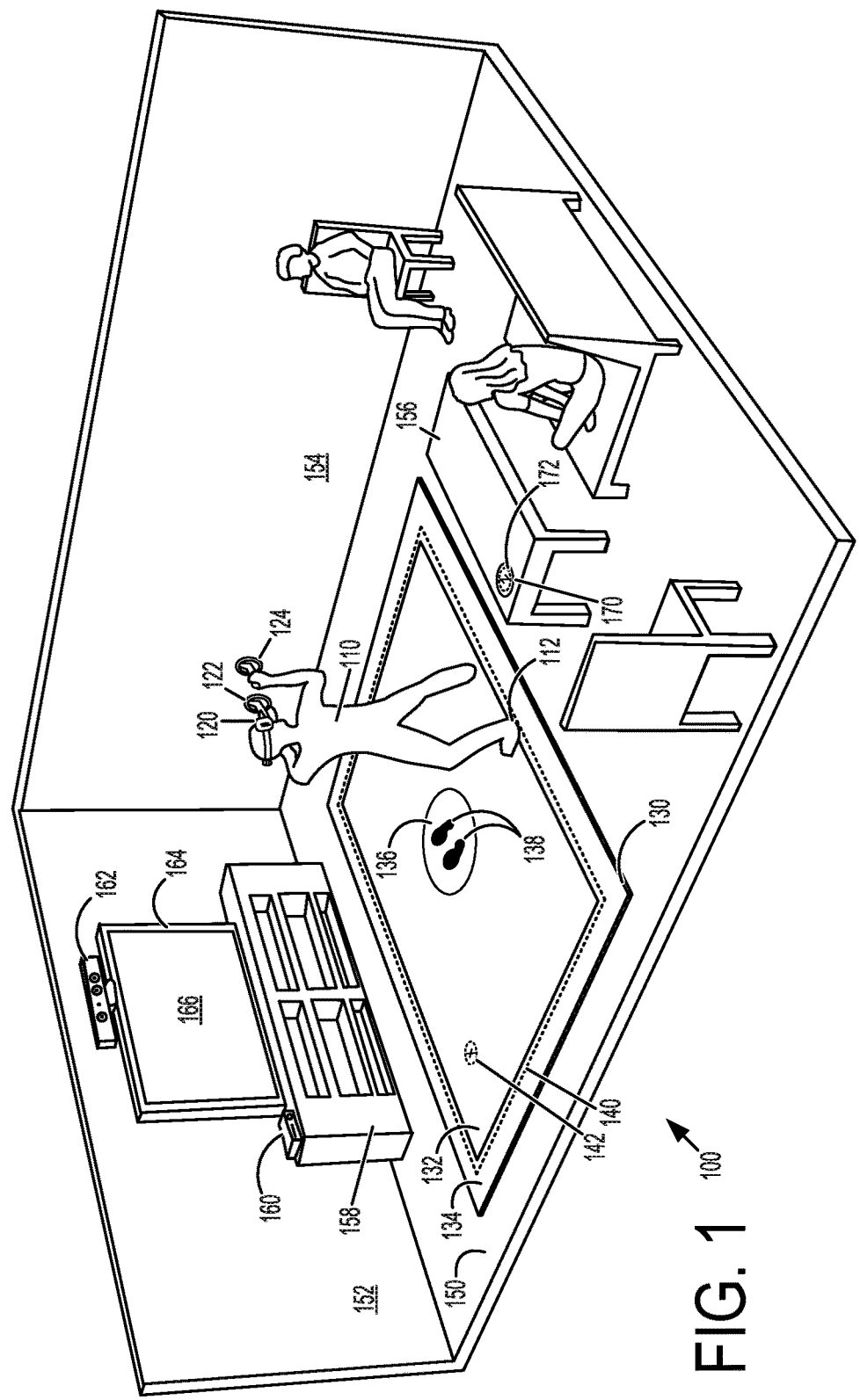
FIG. 1 depicts an example virtual reality use environment.

FIG. 1 depicts an example use environment 100 in which a user 110 is presented a virtual reality experience via a head-mounted display (HMD) device 120 that displays graphical content to the user. The graphical content displayed to user 110 by HMD device 120 may include a virtual reality scene. In at least some implementations, HMD device 120 may display respective left-eye and right-eye views of the virtual reality scene to provide an immersive virtual reality experience in which the user perceives the virtual reality scene in three dimensions and as having depth. HMD device 120 may further output audio and/or haptic stimulus to user 110 as further described herein.

In FIG. 1, user 110 is holding peripheral control devices 122 and 124 that enable the user to interact with a virtual reality environment. As a non-limiting example, user 110 may manipulate peripheral control devices 122 and 124 to direct a virtual fireball at a virtual wizard that is displayed to the user via HMD device 120 as part of the virtual reality experience. Peripheral control devices 122 and 124 may take the form of a handheld controller, for example. In at least some implementations, user 120 may hold peripheral control devices 122 and 124 in respective left and right hands to enable independent hand-based control.

In FIG. 1, user 120 is standing on a floor mat, referred to herein as a virtual reality mat 130 that may be used to define at least part of an activity region for user 120. Mat 130 may take various forms, as described in further detail throughout the present disclosure. As a non-limiting example, mat 130 may include one or more sub-regions, such as an interior region 132, a surrounding region 134, a central region 136, etc. Two or more regions of mat 130 may have different surface textures, thereby providing user 120 with tactile feedback as to the general positioning of the user relative to the mat or the mat's boundaries. For example, user 110 is depicted in FIG. 1 as having a right foot that is touching region 132 and a left foot that is at least partially touching region 134. If user 110 is barefoot or wearing socks, stockings, or other footwear that provides sufficient sensitivity to enable the user to feel textural differences between or among regions of mat 130, the user may be able to determine her or his general positioning relative to the mat. Furthermore, some or all of the regions of mat 130 may have different surface textures as compared to a ground surface 150 upon which mat 130 rests, and a perimeter edge of mat 130 may be sufficiently raised relative to ground surface 150 to enable the user to feel the edge of the mat with her or his feet.

The ability for a user to perceive her or his general location while viewing graphical content of the HMD device that may otherwise occlude the user's visibility of the physical world may enable the user to remain within an activity region that is at least partially defined by physical features of the mat. For example, even if a view of the physical environment for user 110 is completely occluded by HMD device 120, the user may still perceive if she or he is approaching an edge of the mat or other boundary by feeling a change in surface texture between region 132 and 134, by feeling a change in surface texture between the mat and ground surface 150, or by feeling a perimeter edge of the mat. Physical objects located within the surrounding physical environment may be avoided by the user remaining within the activity region during a virtual reality session. For example, within FIG. 1, user 110 may avoid unintended physical contact with walls 152 and 154, table 156, and cabinet 158 by remaining within an activity region containing regions 132 and 136 that is bounded by a boundary between regions 132 and 134 of mat 130.

Furthermore, differences in surface texture and/or visual appearance of mat 130 may enable user 110 to locate a reference location of the mat, such as within central region 136. In at least some implementations, a reference location may be used to initialize an activity region in relation to the reference location for one or more virtual reality sessions. Mat 130 may further include a reference orientation indicator having a different surface texture and/or visual appearance that enables the user to position her or his body or the user's device at a reference orientation. In FIG. 1, for example, mat 130 includes left and right footprint indicators 138 within central region 136 as a non-limiting example of a reference orientation indicator. By standing at a reference location and at a reference orientation (collectively referred to as a reference positioning), user 110 may initialize an activity region that may include, as non-limiting examples, a limited sub-region of mat 130 corresponding to an interior region 132 of the mat that is bounded by surrounding region 134, the entirety of mat 130 bounded by a perimeter edge of the mat, or other suitable boundary that at least partially or wholly resides within mat 130 or outside of mat 130.

As an illustrative example, user 110 may initialize an activity region by standing with her or his feet within central region 136 overlaid upon footprint indicators 138. User 110 may provide one or more user inputs to a virtual reality system that indicates to the system that the user is currently at the reference positioning and/or indicates an identity of the mat (e.g., selects a type of virtual reality mat that corresponds to mat 130 from a list of one or more virtual reality mats). This user input may be used to provide the virtual reality system with an understanding of the mat's shape, size, and positioning relative to a physical subject, such as at the user or the user's device, including HMD device 120, handheld controllers 120 and 122, or another device carried by or mounted upon the user. For example, in a single mat ecosystem, user 130 may initialize an activity region by indicating that the mat is being used and that the user is currently positioned at the reference positioning. Using this information, the virtual reality system may define the activity region as having a particular shape, size, and orientation in relation to that reference positioning.

In at least some implementations, a physical environment of user 120 may be imaged by one or more optical sensors, including one or more cameras located on-board HMD device 120, on-board peripheral control devices 122 and 124, and/or one or more remotely located optical sensors 162, as non-limiting examples. Physical features of mat 130 and other physical objects within the environment may be observed by the virtual reality system via one or more of these optical sensors. Such features may include one or more of: a perimeter edge of mat 130, one or more fiducial markers located on an activity side (i.e., an upper side) of the mat opposite a bottom side of the mat that interfaces with the ground surface, and/or fiducial markers located on or along a perimeter edge of the mat.

In at least some implementations, one or more fiducial markers of mat 130 may themselves physically define a boundary of the activity region. A non-limiting example of a fiducial marker 140 is schematically depicted in FIG. 1 as a broken line that defines a boundary for an example activity region. Alternatively or additionally, one or more fiducial markers of mat 130 may indicate an identity of mat 130, which may be used by the virtual reality system to reference profile data for mat 130, which in turn defines shape, size, and/or orientation parameters for the mat in relation to the one or more fiducial markers or other suitable feature(s) of mat 130 or the physical environment in general. A non-limiting example of a fiducial marker 142 is schematically depicted in FIG. 1 that indicates an identity of mat 130. Fiducial marker 142 may take the form of a machine-vision-readable code in at least some implementations, such as a bar code, QR code, or other suitable non-human readable code that is recognizable by a machine-vision module of the virtual reality system. Fiducial markers 140 and 142, while depicted in FIG. 1 on an activity surface of mat 130, may not be visible to the human eye, but may reflect a spectrum of light in a non-visible range, such as infrared, for capture by an infrared camera of the virtual reality system, as an example.

Also within FIG. 1, a variety of other hardware components are present, including a computing device 160, one or more optical sensor(s) 162 that are remotely located from user 110, and a display device 164 having a graphical display 166. Some or all of these hardware components may form part of a virtual reality system in combination with HMD device 120, mat 130, and peripheral control devices 122 and 124. In some examples, computing device 160 may take the form of a gaming console, and HMD device 120 and peripheral control devices 122 and 124 may be peripheral to the gaming console. In other examples, peripheral control devices 122 and 124 may be peripheral to the HMD device 120, and the HMD device 120 may itself take the form of a computing device that is not peripheral to another computing device. HMD device 120 and peripheral control devices 122 and 124 may communicate with each other and/or with computing device 160, optical sensors 162, display device 164, mat 130, or other devices via wired and/or wireless communication links over a personal, local, and/or wide area network, depending on implementation. A virtual reality system may include one or more of HMD device 120, peripheral control devices 120 and 122, mat 130, computing device 160, optical sensors 162, display device 164, and other devices accessible over a communications network.

FIG. 1 further depicts an example of a physical object 170 in the form of a card or tile having a fiducial marker 172 that may be visually identified by the virtual reality system via one or more optical sensors. In contrast to fiducial markers 140 and 142 that are associated with an activity region of mat 130, fiducial marker 172 is instead associated with an excluded region of the physical environment that may be defined by the virtual reality system in relation to fiducial marker 172. For example, a user may place physical object 170 on table 156 to identify table 156 as an excluded region of the physical environment with respect to the virtual reality system. The excluded region may have a predefined shape, size dimensions, and/or orientation in relation to a positioning of fiducial marker 172. Visual, auditory, or haptic feedback may be output in response to a physical subject, such as user 110 or HMD device 120 approaching within a threshold proximity of the excluded region or fiducial marker 172.

Figure 2:
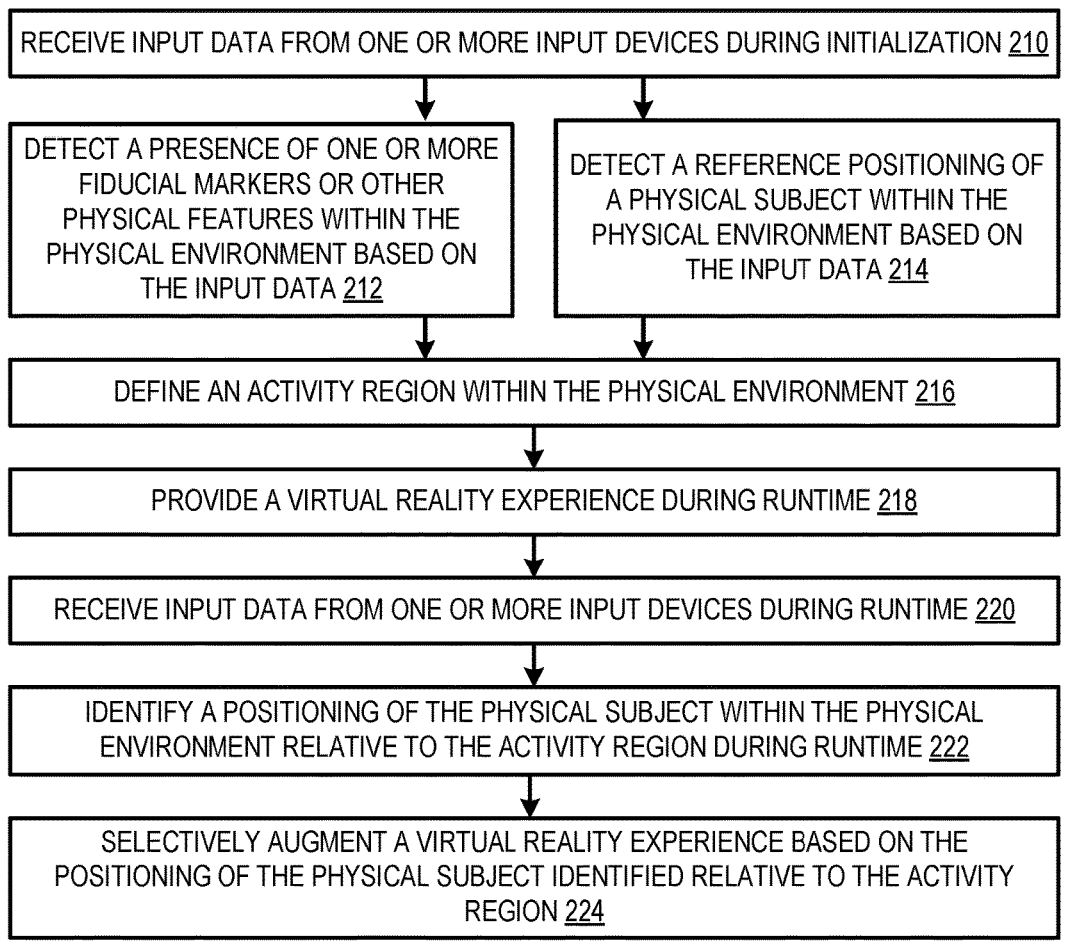
FIG. 2 is a flow diagram depicting an example virtual reality method.
Figure 9:
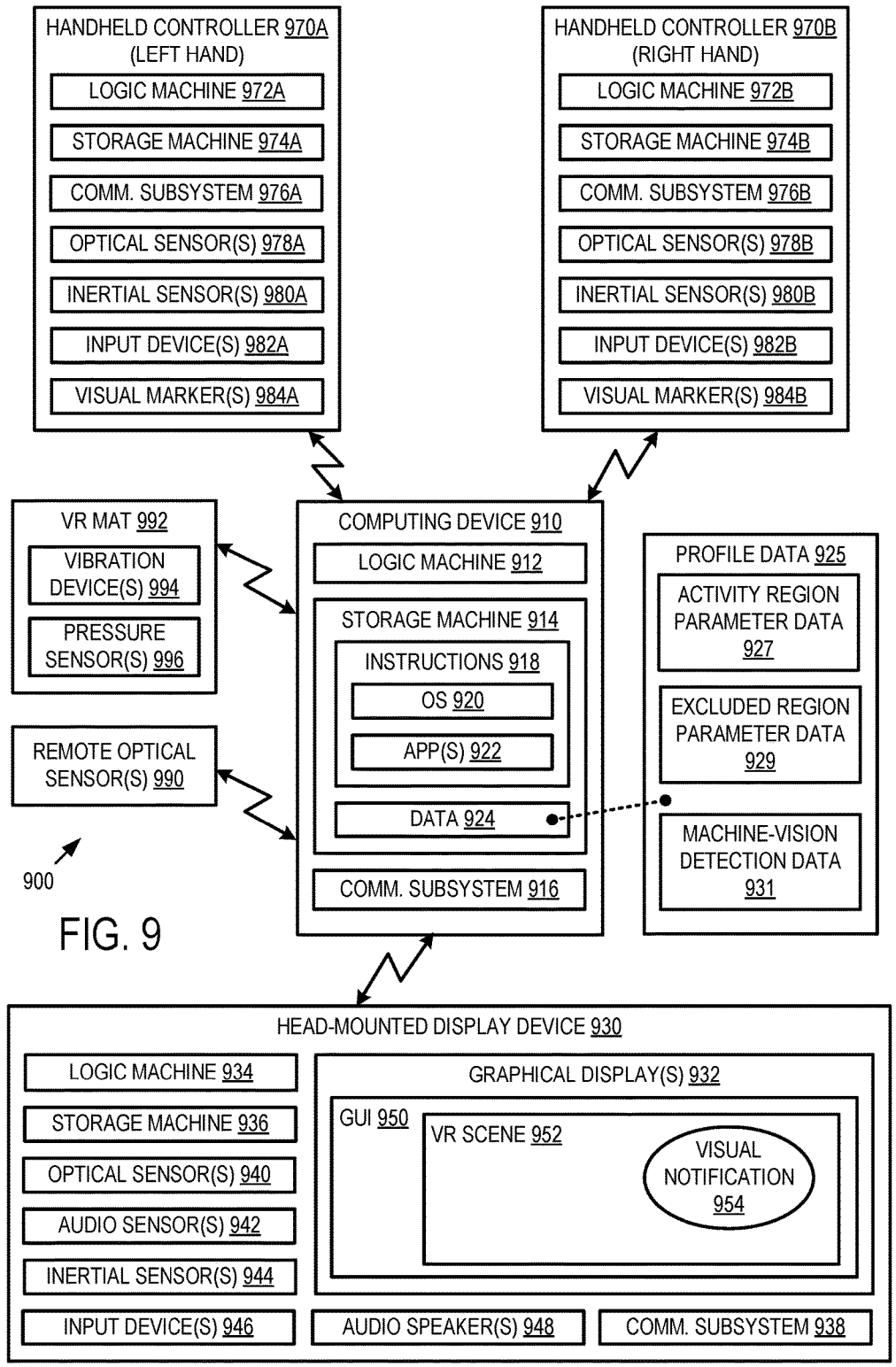
FIG. 9 is a schematic diagram depicting an example computing system.

FIG. 2 is a flow diagram depicting an example virtual reality method 200. Method 200 may be performed by a virtual reality system including one or more computing devices, for example. FIG. 9 depicts a non-limiting example of a virtual reality system that may perform method 200.

At 210, the method includes receiving input data. The input data may be received via one or more input devices of a virtual reality system that performs method 200. The one or more input devices may form part of a head-mounted (HMD) device or other user device carried by or mounted upon a user. Alternatively or additionally, the one or more input devices may be remotely located from the user. The input data may be received at 210 during an initialization phase that is performed, at least in part, to define an activity region within a physical environment for one or more sessions of a subsequent runtime phase during which a virtual reality experience may be provided to a user.

The one or more input devices may take the form of one or more sensors by which sensor data may be received. These sensors may include optical sensors by which image data may be received, spatial positioning sensors (e.g., inertial, accelerometer, magnetometer, inclinometer, GPS, etc.) by which positioning data may be received for one or more degrees of freedom (e.g., 6DOF), audio sensors (e.g., microphone) by which audio data may be received, electroencephalography (EEG) sensors by which EEG data may be received, user input sensors associated with user interfaces by which user input data may be received, and/or pressure sensors by which pressure data may be received from a virtual reality mat, as non-limiting examples.

In the visual domain, input data may include image data that is received via one or more optical sensors imaging a physical environment. The one or more optical sensors take the form of a forward-facing camera of an HMD device and/or a camera located on-board another user device carried by or mounted upon a user. Alternatively or additionally, one or more optical sensors may include one or more cameras that are remotely located from the user. For example, an optical sensor may be remotely located from the user at a fixed positioning to image a physical environment containing the user, a virtual reality mat, and other physical objects (e.g., including fiducial markers).

User input data may be received from one or more user input interfaces responsive to a user providing user input. The one or more user interfaces may include a graphical user interface, a touch-sensitive display or surface, a peripheral control device such as a physical handheld controller or computer mouse featuring one or more physical buttons or control elements, as non-limiting examples. Additionally or alternatively, user interfaces may include a natural language interface for processing spoken commands that are received as audio data from an audio sensor and/or a body tracking interface for processing body pose and facial features that are received as image data from an optical sensor, as additional non-limiting examples.

In at least some implementations, the user input data may be provided in response to a user indicating an identity of a virtual reality mat for use during runtime with one or more subsequent virtual reality sessions. For example, a user may identify to the virtual reality system via a menu of a graphical user interface or other suitable user input interface that a particular virtual reality mat is being used. The user input data may further indicate that a positioning of a physical subject is at a reference location and/or reference orientation (collectively a reference positioning) indicated by one or more physical features of the mat. For example, a user may identify to the virtual reality system via a menu of a graphical user interface or other suitable user input interface that the user or the user's device is currently positioning at the reference positioning. The virtual reality system may store input data, such as image data and/or pressure data when the user or the user's device is identified as being positioning at the reference positioning.

Furthermore, in at least some implementations, a virtual reality mat may include a plurality of spatially distributed pressure sensors integrated into the mat to detect a physical pressure or force applied to an activity surface of the mat. Pressure sensors integrated with a virtual reality mat are described in further detail with reference to FIGS. 3 and 9, for example. Such pressure sensors enable the virtual reality system to identify where the user is standing in relation to the mat, without necessarily requiring that the user be visually detected by an optical sensor.

At 212, the method includes detecting a presence of one or more fiducial markers or other physical features within the physical environment based on the input data received at 210, including image data received via one or more optical sensors. The presence of one or more physical features may be detected by applying one or more machine vision algorithms to the image data. The machine vision algorithms may be previously trained using supervised machine learning with training images of the one or more physical features as training input. For purposes of this training, it will be understood that the physical features in the training images not be literally the same physical features in a particular user's floor mat, but rather identically configured physical features that will be consistently recognized by the machine vision algorithms once trained.

In at least some implementations, the one or more fiducial markers of a virtual reality mat or other object may physically define a boundary of the activity region, as depicted in FIG. 1, for example. The one or more fiducial markers may alternatively or additionally indicate an identity of the mat or other object having the fiducial marker, which may be used by the virtual reality system to reference profile data for that identity. A machine-vision-readable code of the one or more fiduciary markers may indicate the identity of the mat or other physical object, depending implementation.

As an example, the one or more fiducial markers may be provided upon a virtual reality mat located within the physical environment. Alternatively or additionally, the one or more fiducial markers may be provided on moveable objects (e.g., cards or tokens) and/or on non-moveable physical surfaces (e.g., walls, floor, ceiling). The one or more fiducial markers may be a permanent feature of the floor mat, moveable objects, or non-moveable surfaces. Alternatively or additionally, the one or more fiducial markers may take the form of light projections by one or more light sources onto the virtual reality mat, moveable objects, or non-moveable surfaces. Fiducial markers may be spatially represented in two-dimensional or three-dimensional space upon a surface and may be further represented by a spectrum of light reflect by the fiducial markers, including visible light colors, infrared, near-infrared, etc. Fiducial markers that take the form of machine-vision-readable codes may or may not be human readable, depending on implementation. Operation 212 may be omitted in at least some implementations, such as where visual detection of fiducial markers or other features of a virtual reality mat is not performed.

At 214, the method includes detecting a reference positioning of a physical subject within the physical environment based on the input data received at 210. The physical subject may include a user or a user device, such as an HMD device or other device carried by or mounted upon the user. As previously described, a user may stand at a reference positioning of a virtual reality mat to initialize an activity region. The user may additionally identify the virtual reality mat to the virtual reality system.

The virtual reality system may retrieve profile data for the mat from a data storage device based on the identity of the mat, which may be indicated by one or more physical features visually detected within image data at 212 and/or by user input received via a user input device at 214. The profile data may include activity region parameter data that identifies a shape, size dimensions, and/or an orientation of an activity region relative to one or more physical features of the mat in two or three-dimensional space. Alternatively, the profile data may include excluded region parameter data that identifies a shape, size dimensions, and/or an orientation of an excluded region relative to one or more physical features of the mat or other physical object in two or three-dimensional space.

At 216, the method includes defining an activity region (or alternatively an excluded region) within the physical environment based, at least in part, on one or more identified features of the mat or other objects in the physical environment. In at least some implementations, the activity region is defined within the physical environment based on one or more fiducial markers visually detected within the physical environment via one or more optical sensors. In the case of a virtual reality mat, the activity region may be defined in relation to one or more physical features of the mat, which may include one or more fiducial markers of the mat and/or a perimeter edge of the mat, as non-limiting examples. Alternatively or additionally, the activity region may be at least partially defined within the physical environment based on activity region parameter data within the profile data retrieved from a data storage device based on an identity of the mat or other fiducial marker.

The activity region may include at least a two-dimensional activity region that is defined by one or more boundaries and is within a plane that is parallel to a plane of the mat and/or the ground surface upon which the mat rests. Similarly, an excluded region may include at least a two-dimensional excluded region that is defined by one or more boundaries and is within a plane that is parallel to a plane of the ground surface.

At 218, the method includes providing a virtual reality experience during runtime of a virtual reality session. For example, the virtual reality system may execute an operating system and one or more application programs at a computing system of the virtual reality system to present one or more of visual stimuli, auditory stimuli, and/or haptic stimuli to a user via one or more output devices. Such output devices may be located on-board an HMD device, a peripheral control device, or integrated with the virtual reality mat.

At 220, the method includes receiving input data from one or more input devices during runtime. The input data received at 220 may be similar to the input data received at 210, as previously described with reference to the various input devices of a virtual reality system. However, during runtime, the user is typically interacting with virtual reality content, such as may be provided by an application program executed by a computing device.

At 222, the method includes identifying a positioning of the physical subject within the physical environment relative to the activity region. Operation 222 may be performed during runtime of the virtual reality session, for example. As previously discussed, the physical subject may include a user or a user device carried by or mounted upon the user. The positioning of the physical subject relative to the activity region may be identified based at least in part on one or more of: the image data received during initialization and/or subsequent image data received via the one or more optical sensors during a subsequent virtual reality session, spatial positioning data received from one or more spatial positioning sensors carried by or mounted upon the physical subject, and/or pressure data received from one or more pressure sensors of the virtual reality mat. During runtime, the positioning of the physical subject may be identified by the virtual reality system relative to the activity region and various physical features of the physical environment by translating positioning data between a reference frame of the activity region and such physical features and a reference frame of the physical subject being tracked for comparison within a common reference frame.

At 224, the method includes selectively augmenting a virtual reality experience based on the positioning of the physical subject identified relative to the activity region. The virtual reality experience may be selectively augmented by outputting one or more of a visual notification, an auditory notification, or a haptic notification via an output device. For example, a notification may be output responsive to the physical subject being within a threshold proximity of a boundary of the activity region or being outside of the activity region. A visual notification may take the form of a visual representation of a boundary within the virtual environment displayed to the user via an HMD device that tracks a physical positioning of the boundary of the activity region within the physical environment. An auditory notification may be output via an audio speaker of an HMD device or other device carried by or remotely located from the user. A haptic notification may be output via a vibration device of an HMD or other device carried by the user, or via a vibration device integrated into the virtual reality mat. As previously described, the mat may include one or more integrated vibration devices to generate vibration at the mat that may be perceived by the user to augment the virtual reality experience.

FIGS. 3-8 schematically depict additional non-limiting examples of a special-purpose virtual reality mat that may be used in accordance with the present disclosure. In FIG. 3-8, an activity side of the example mats are depicted within a plane that is parallel to a plane of a ground surface upon which the mat rests.

Figure 3:
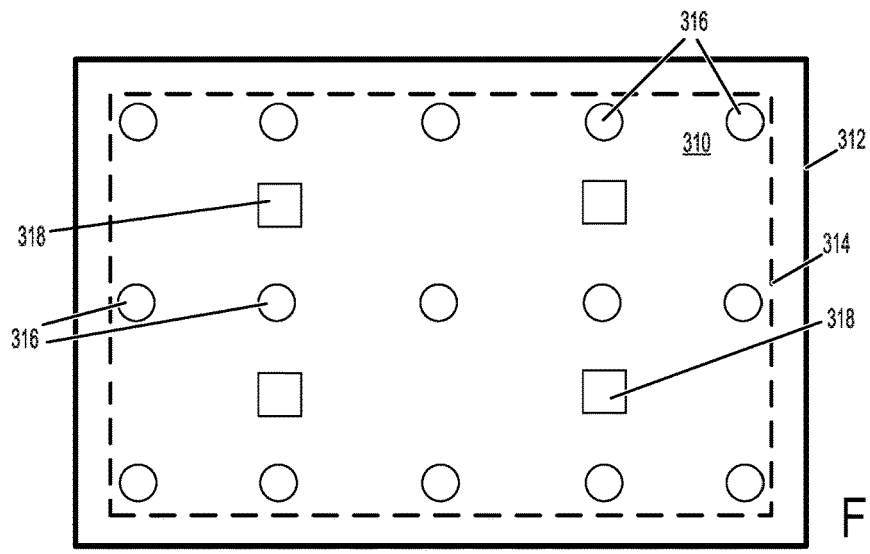
FIGS. 3-5 depict example virtual reality mats having fiducial markers.

FIG. 3 schematically depicts an example mat 310 having a perimeter edge 312 and a set of one or more fiducial markers 314 (depicted as a broken line in FIG. 3) that physically define a boundary of an activity region within a physical environment. FIG. 3 also schematically depicts a plurality of spatially distributed pressure sensors 316 (depicted as circles in FIG. 3) integrated within mat 310 at various locations that are operable to output pressure data to the virtual reality system. FIG. 3 also schematically depicts a plurality of spatially distributed vibration devices 318

(depicted as squares in FIG. 3) that are operable to provide haptic feedback to a user via the users physical interaction with the mat.

Figure 4:
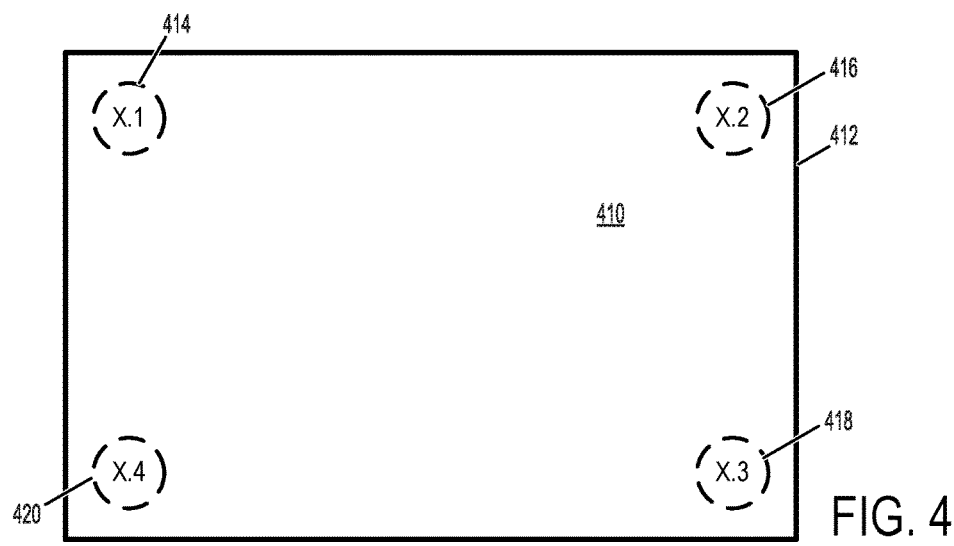

FIG. 4 schematically depicts an example mat 410 having a perimeter edge 412 and a set of fiducial markers 414, 416, 418, and 420. The fiducial markers of FIG. 4 may physically define a boundary of an activity region within a physical environment by representing respective vertices of the activity region (e.g., four corners of a rectangle). Additionally or alternatively, the fiducial markers of FIG. 4 may each convey additional information, including indicating an identity of mat 410 and/or indicating an identity of each vertex of the activity region. For example, the fiducial markers of FIG. 4 may include machine-vision-readable codes that can be interpreted by the virtual reality system.

Figure 5:
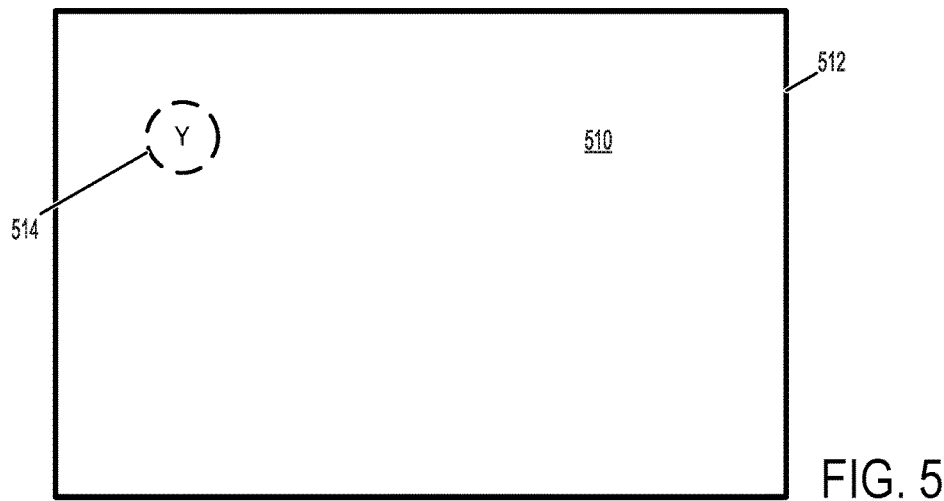

FIG. 5 schematically depicts an example mat 510 having a perimeter edge 512 and a fiducial marker 514. Fiducial marker 514 may convey additional information, including an identity of mat 510, for example. Fiducial marker 514 may also serve as a physical feature of the mat with respect to which a positioning of an activity region may be defined.

Figure 6:
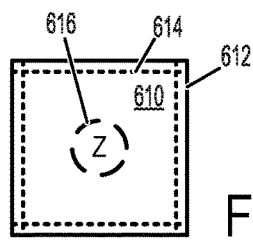
FIGS. 6-8 depict example tiles having fiducial markers that may be combined with other tiles to form multi-tile virtual reality mats.

FIG. 6 schematically depicts an example mat portion or tile 610 that may be combined with other tiles to collectively form a multi-tile reconfigurable mat. Tile 610 includes a perimeter edge 612, a first set of fiducial markers 614 that may physically define a portion of a boundary of an activity region within a physical environment, depending on how tile 610 is configured relative to other tiles of the multi-tile reconfigurable mat. Tile 610 may alternatively or additionally include a second fiducial marker 616 that conveys additional information, including an identity of tile 610, for example. Fiducial marker 610 may also serve as a physical feature of the mat with respect to which a positioning of an activity region of a multi-tile reconfigurable mat may be defined. In at least some implementations, perimeter edge 612 may have a pattern of interlocking elements that interlock with corresponding interlocking elements of another instance of tile 610 or another type of tile of a tile ecosystem that is compatible with tile 610.

Figure 7:
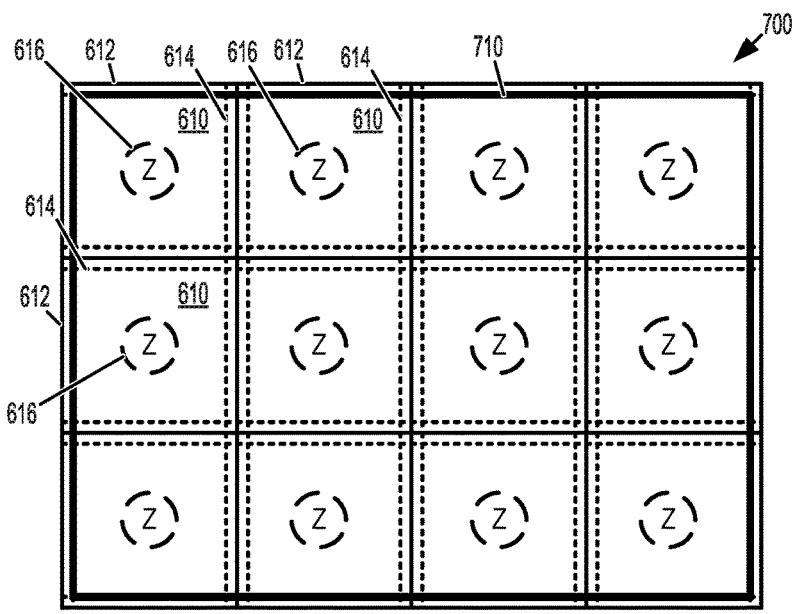

FIG. 7 depicts an example of a multi-tile reconfigurable mat 700 formed from a set of twelve instances of tile 610 of FIG. 6. In this example, the twelve instances of tile 610 collectively form a rectangular mat. In at least some implementations, a virtual reality system may be configured to identify at least one, some, or all instances of tile 610 that form a multi-tile mat based on respective instances of fiducial markers 614 and/or 616, for example. Upon identifying respective instances of tile 610, the virtual reality system may define an activity region (e.g., 710 in FIG. 7) that is formed by a contiguous exterior set of fiducial markers or portions of fiducial markers 614. For example, activity region 710 is formed from fiducial marker segments of tiles that form part of a perimeter edge of the multi-tile mat.

Figure 8:
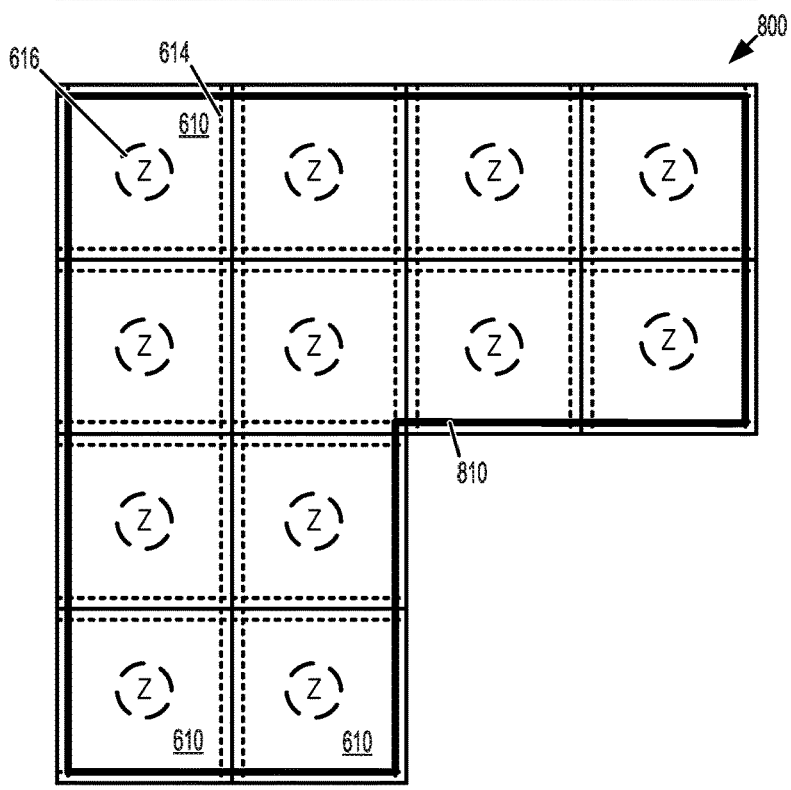

FIG. 8 depicts another example of a multi-tile reconfigurable mat 800 formed from a set of twelve instances of tile 610 of FIG. 6. In this example, the twelve instances of tile 610 collectively form an L-shaped mat. Upon identifying instances of tile 610, the virtual reality system may again define an activity region (e.g., 810 in FIG. 8) that is formed by a contiguous exterior set of fiducial markers or portions of fiducial markers 614. For example, activity region 810 is formed from fiducial marker segments of tiles that form part of a perimeter edge of the multi-tile mat.

The special-purpose floor mats and floor mat portions disclosed herein may be specifically configured for use with a virtual reality system. Such mats or mat portions may have any suitable shape, including a triangle, a square, a rectangle, a circle, an ellipse, a regular polygon having five or more sides, an irregular polygon having four or more sides, an irregular non-polygonal shape, etc., as non-limiting examples. Such mats or mat portions may be rigid, elastomeric, rollable, or foldable. Such mats or mat portions may be formed from any suitable material or combination of materials, including foam, rubber, plastic, metal, wood, fabric, carpet, etc., as non-limiting examples. In at least some implementations, the fiducial markers disclosed herein with respect to such mats or mat portions may instead be projected onto a surface (e.g., a mat or mat portion, or directly onto a floor or other ground surface) by a light source using visible spectrum light, infrared, near-infrared, or other suitable portion of the spectrum.

In at least some implementations, the methods and processes described herein may be tied to a computing system that includes one or more computing devices. In particular, such methods and processes may be implemented as computer-based instructions and/or data including an operating system, application program, service, application-programming interface (API), library, and/or other computer-program product.

FIG. 9 schematically shows an example of a computing system 900 that can enact one or more of the methods and processes described herein. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), display devices (e.g., HMD device), peripheral control devices, wearable devices, and/or other computing devices. Computing system 900 may be referred to as a virtual reality system or otherwise form part of a virtual reality system within the context of the present disclosure.

Computing system 900 includes one or more computing devices of which computing device 910 is a non-limiting example. Computing device 910 includes a logic machine 912, a storage machine 914, and a communication subsystem 916. Computing device 910 may optionally include a display subsystem, an input subsystem, and/or other components not shown in FIG. 9.

Logic machine 912 includes one or more physical devices configured to execute instructions. For example, a logic machine may be configured to execute instructions that are part of one or more operating systems, applications, services, programs, routines, libraries, objects, components, data structures, or other logical constructs. Such instructions may be implemented to perform a task, implement a data type, transform the state of one or more components, achieve a technical effect, or otherwise arrive at a desired result. For example, instructions 918 held in storage machine 914 may include an operating system 920, one or more application programs 922, and/or data 924.

A logic machine may include one or more processors configured to execute software instructions. Additionally or alternatively, a logic machine may include one or more hardware or firmware logic machines configured to execute hardware or firmware instructions. Processors of a logic machine may be single-core or multi-core, and the instructions executed thereon may be configured for sequential, parallel, and/or distributed processing. Individual components of a logic machine optionally may be distributed among two or more separate devices, which may be remotely located and/or configured for coordinated processing. Aspects of a logic machine may be virtualized and executed by remotely accessible, networked computing devices configured in a cloud-computing configuration.

Storage machine 914 includes one or more physical devices (e.g., data storage devices) configured to hold instructions 918 and/or data 924. Instructions 918 may be executable by logic machine 912 to implement the methods and processes described herein. When such methods and processes are implemented, the state of storage machine 914 may be transformed—e.g., to hold different data.

As a non-limiting example, data 924 may include profile data 925, which may refer to profile data for any of the previously described virtual reality mats or other fiducial markers disclosed herein. Each of these identities, whether a virtual reality mat or a fiducial marker of another physical object, may be represented in profile data 925 by an identifier that is sufficiently unique within a domain of identities to enable a virtual reality system to distinguish between or among such identities. Each of these identities may be associated with a respective set of activity region parameters 927 or excluded region parameters 929 via its respective identifier, and may be further associated with machine-vision detection data 931. In at least some implementations, such parameters 927 and/or 929 may be associated with an identifier that indicates whether its region is an activity region or an excluded region for each identity in profile data 925.

Activity region parameters 927 for a virtual reality mat or other fiducial marker may identify one or more of a shape, size dimensions, and/or orientation of a corresponding activity region in relation to one or more reference points (e.g., physical features) in at least two-dimensional space. Similarly, excluded region parameters 929 for a fiducial marker may identify one or more of a shape, size dimensions, and/or orientation of a corresponding excluded region in relation to one or more reference points (e.g., physical features) in at least two-dimensional space.

Machine vision detection data 931 may include any suitable data that enables a machine vision module (e.g., of operating system 920 or one or more of applications 992) executed by a computing device or computing system to search for, detect, and identify virtual reality mats or other fiducial markers based on physical features observed within image data captured by an optical sensor. Machine vision detection data 931 may be developed by prior training of machine vision algorithms using supervised machine learning with training images of physical features including fiducial markers, virtual reality mats, and other objects to be detected by the virtual reality system as training input. A computing device or computing system of the disclosed virtual reality system may receive an identifier represented by a fiducial marker or an identity of a virtual reality mat for observed physical features as well as user-identified mat identities, and may retrieve and reference profile data 925 for those identities to define an activity region or an excluded region within a physical environment.

A storage machine may include removable and/or built-in devices (e.g., data storage devices). A storage machine may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. A storage machine may include volatile, nonvolatile, dynamic, static, read/write, read-only, random-access, sequential-access, location-addressable, file-addressable, and/or content-addressable devices.

It will be appreciated that a storage machine includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 912 and storage machine 914 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 912 executing instructions 918 held by storage machine 914. It will be understood that different modules, programs, and/or engines may be instantiated from the same operating system, application, service, code block, object, library, routine, API, function, etc. Likewise, the same module, program, and/or engine may be instantiated by different operating systems, applications, services, code blocks, objects, routines, APIs, functions, etc. The terms "module," "program," and"engine" may encompass individual or groups of executable files, data files, libraries, drivers, scripts, database records, etc.

It will be appreciated that a "service", as may be used herein, is an application program executable across multiple user sessions. A service may be available to one or more system components, programs, and/or other services. In some implementations, a service may run on one or more server-computing devices.

Computing system 900 may include one or more peripheral devices such as an HMD device 930 and handheld controllers 970A and 970B. These peripheral devices may themselves take the form of a computing device or may be integrated with computing device 910 in a common enclosure. HMD device 930 includes one or more graphical displays 932, and is a non-limiting example of a display device. For example, HMD device 930 may include independent right and left-eye graphical displays. It will be understood that a display device may take other forms, such as a mobile handheld or tablet display device, for example. Graphical displays 932 forming one or more display regions may be used to present a graphical user interface (GUI) 950, which may include a virtual reality scene 952 that may be selectively augmented with a visual notification 954, for example.

HMD device 930 may additionally include a logic machine 934, a storage machine 936, a communication subsystem 938, one or more optical sensors 940 (e.g., cameras), one or more audio sensors 942 (e.g., microphones), one or more spatial positioning sensors 944 (e.g., accelerometers, gyroscopes, magnetometers, inclinometers, GPS, etc.), one or more other input devices 946 (e.g., buttons, touch-sensitive surfaces, etc.), and one or more audio speakers 948. Optical sensors 940 of HMD device 930 may include one or more forward-facing cameras that approximate a perspective of a person wearing the HMD device. The various sensors of HMD device 930 and/or other input devices 946 may provide a user interface by which a user provides a user input, as described herein.

Handheld controllers 970A and 970B are non-limiting examples of peripheral control devices, as described herein. For example, handheld controller 970A may correspond to a controller for a left hand and handheld controller 970B may correspond to a controller for a right hand of a user. Handheld controllers 970A and 970B may each additionally include logic machines 972A and 972B, storage machines 974A and 974B, communication subsystems 976A and 976B, one or more optical sensors 978A and 978B (e.g., cameras), one or more spatial positioning sensors 980A and 980B, one or more other input devices 982A and 982B (e.g., buttons, touch-sensitive surfaces, joystick, etc.), and one or more visual markers 984A and 984B. Visual markers 984A and 984B may be configured in a constellation pattern that enables a positioning of handheld controllers 970A and 970B to be determined from images captured via a camera, such as a forward-facing camera of optical sensors 940 of HMD device 930 or other remote optical sensors 990.

Virtual reality mat 992 may refer to any of the previously described virtual reality mats of the present disclosure, and may be a peripheral device of computing device 910 and/or HMD device 930, depending on implementation. In at least some implementations, virtual reality mat 992 may include one or more spatially distributed vibration devices 994 and/or one or more spatially distributed pressure sensors 996, for example, as previously described with reference to FIG. 3. Vibration devices 994 may be individually operated by computing device 910, for example, to provide haptic feedback to a user at particular locations across an activity surface of mat 992, or selected set of the plurality of vibration devices may be operated in concert to provide haptic feedback to the user in varying intensity. Spatially distributed pressure sensors 996 may be used, for example, by computing device 910 to identify a positioning of a user in relation to the activity surface of mat 992 in which higher pressure readings reported by a particular pressure sensor may be indicative of the user being in closer proximity to that pressure sensor. As a non-limiting example, pressure sensors 996 may take the form of strain gauges across which electrical resistance varies with applied force, such as from a user standing upon the virtual reality mat.

When included, a display device may be used to present a visual representation of data held by a storage machine. This visual representation may take the form of a GUI. As the herein described methods and processes change the data held by the storage machine, and thus transform the state of the storage machine, the state of display device may likewise be transformed to visually represent changes in the underlying data. A display device may be combined with a logic machine and/or storage machine in a shared enclosure, or such display devices may be peripheral display devices.

When included, an input interface may utilize one or more user-input devices such as a keyboard, mouse, touch screen, handheld controller, HMD device, etc. In at least some implementations, an input interface may utilize natural user input (NUI) componentry. Such componentry may be integrated or peripheral, and the transduction and/or processing of input actions may be handled on or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, a communication subsystem may be configured to communicatively couple a computing device or peripheral device with one or more other computing devices or peripheral devices. For example, computing device 910, HMD device 930, handheld controllers 970A and 970B, remote optical sensors 990, and virtual reality mat 992 may communicate with each other via their respective communication subsystem over a wired or wireless link. Accordingly, a communication subsystem may include wired and/or wireless communication devices compatible with one or more communication protocols. As non-limiting examples, a communication subsystem may be configured for communication via a wireless and/or wired local or wide area network. In some embodiments, the communication subsystem may allow computing system 900 to send and/or receive messages to and/or from other devices via a network such as the Internet.

FIG. 9 schematically depicts a non-limiting example in which computing device 910 communicates with HMD device 930, handheld controllers 970A and 970B, remote optical sensors 990, and virtual reality mat 992. For example, communications between HMD device 930 and handheld controllers 970A and 970B or between HMD device 930 and a virtual reality mat 992 may traverse computing device 910. It is to be understood that one or more of these devices may communicate with each other directly or via another device. For example, handheld controllers 970A and 970B or virtual reality mat 992 may communicate with computing device 910 via HMD device 930. In this example, communications between computing device 910 and VR mat 992 or handheld controllers 970A and 970B may traverse HMD device 930. As yet another example, computing device 910 and HMD device 930 may be combined or otherwise integrated into a common device enclosure.

An example implementation of a virtual reality system disclosed herein comprises: an optical sensor; a floor mat having one or more fiducial markers; and a computing system. The computing system is configured to receive image data from the optical sensor imaging a physical environment; detect a presence of the one or more fiducial markers of the floor mat within the physical environment based on the image data; define an activity region within the physical environment based on the one or more fiducial markers detected within the physical environment; identify a positioning of a physical subject within the physical environment relative to the activity region; and selectively augment a virtual reality experience based on the positioning of the physical subject identified relative to the activity region. In this or any other implementation disclosed herein, the floor mat may include a plurality of spatially distributed pressure sensors integrated into the floor mat to detect a physical pressure applied to an activity surface of the floor mat; and the positioning of the physical subject may be identified based, at least in part, on pressure data received from at least one pressure sensor of the plurality of pressure sensors. In this or any other implementation disclosed herein, the floor mat may include one or more vibration devices integrated into the floor mat to generate vibration at the floor mat; and the virtual reality experience may be augmented by generating vibration at the floor mat via at least one vibration device of the one or more vibration devices. In this or any other implementation disclosed herein, the floor mat may include an interior region having a first surface texture and a surrounding region having a second surface texture that differs from the first surface texture.

An example implementation of a head-mounted display device disclosed herein comprises: one or more output devices including a near-eye graphical display; one or more input devices including a camera; and a computing device programmed with instructions executable by the computing device to: receive image data from the camera; detect a presence of one or more physical features of a floor mat for use with a session of the virtual reality system by applying one or more machine vision algorithms to the image data, the one or more machine vision algorithms previously trained using supervised machine learning with training images of the one or more physical features as training input; retrieve profile data for the floor mat from a data storage device based on an identity of the floor mat indicated by the one or more physical features; define an activity region within a physical environment based, at least in part, on the profile data for the floor mat; identify a positioning of a physical subject within the physical environment relative to the activity region based on input data received via the one or more input devices; and selectively augment a virtual reality experience provided via the one or more output devices of the head-mounted display device based on the positioning of the physical subject identified relative to the activity region. In this or any other implementation disclosed herein, the activity region may be defined in relation to the one or more physical features of the floor mat. In this or any other implementation disclosed herein, the one or more physical features may include one or more fiduciary markers. In this or any other implementation disclosed herein, the one or more fiduciary markers may physically define a boundary of the activity region. In this or any other implementation disclosed herein, a machine-vision-readable code of the one or more fiduciary markers may indicate the identity of the floor mat. In this or any other implementation disclosed herein, the virtual reality experience may be selectively augmented by outputting one or more of a visual notification, an auditory notification, or a haptic notification via an output device of the one or more output devices. In this or any other implementation disclosed herein, the one or more notifications may be output responsive to the physical subject being within a threshold proximity of a boundary of the activity region or being outside of the activity region. In this or any other implementation disclosed herein, the positioning of the physical subject relative to the activity region may be identified based at least in part on the image data and/or subsequent image data received via the camera. In this or any other implementation disclosed herein, the one or more input devices of the head-mounted display device may further include one or more spatial positioning sensors; and the positioning of the physical subject relative to the activity region may be identified based at least in part on positioning data received from the one or more spatial positioning sensors.

An example implementation of a virtual reality method disclosed herein comprises: receiving input data via an input device of a virtual reality system; identifying one or more physical features of a floor mat for use with a session of the virtual reality system based on the input data; defining an activity region within a physical environment based, at least in part, on the identified one or more physical features of the floor mat; identifying a positioning of a physical subject within the physical environment relative to the activity region; and selectively augmenting a virtual reality experience based on the positioning of the physical subject identified relative to the activity region. In this or any other implementation disclosed herein, the input data may include user input data that indicates an identity of the floor mat for use with the session. In this or any other implementation disclosed herein, the method may further comprise: retrieving profile data for the floor mat from a data storage device based on the identity of the floor mat; and the activity region may be at least partially defined within the physical environment based on the profile data for the floor mat. In this or any other implementation disclosed herein, the user input data may further indicate that the positioning of the physical subject is at a reference location and/or reference orientation indicated by the one or more physical features of the floor mat. In this or any other implementation disclosed herein, the positioning of the physical subject relative to the activity region may be identified based at least in part on the image data received via an optical sensor. In this or any other implementation disclosed herein, the positioning of the physical subject relative to the activity region may be identified based at least in part on positioning data received from one or more spatial positioning sensors. In this or any other implementation disclosed herein, the input data may include image data captured via an optical sensor, and the one or more physical features may be identified by applying one or more machine vision algorithms to the image data in which the one or more machine vision algorithms are previously trained using supervised machine learning with training images of the one or more physical features as training input. In this or any other implementation disclosed herein, the method may further comprise retrieving profile data for the floor mat from a data storage device based on an identity of the floor mat indicated by the one or more physical features; and the activity region may be at least partially defined within the physical environment based on the profile data for the floor mat. It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A virtual reality system, comprising:
   an optical sensor;
   a floor mat having one or more fiducial markers; and
   a computing system configured to:
      receive image data from the optical sensor imaging a physical environment;
      detect a presence of the one or more fiducial markers of the floor mat within the physical environment based on the image data;
      define an activity region within the physical environment based on the one or more fiducial markers detected within the physical environment;
      identify a positioning of a physical subject within the physical environment relative to the activity region; and
      selectively augment a virtual reality experience based on the positioning of the physical subject identified relative to the activity region.

2. The virtual reality system of claim 1, wherein the floor mat includes a plurality of spatially distributed pressure sensors integrated into the floor mat to detect a physical pressure applied to an activity surface of the floor mat; and wherein the positioning of the physical subject is identified based, at least in part, on pressure data received from at least one pressure sensor of the plurality of pressure sensors.

3. The virtual reality system of claim 1, wherein the floor mat includes one or more vibration devices integrated into the floor mat to generate vibration at the floor mat; and
wherein the virtual reality experience is augmented by generating vibration at the floor mat via at least one vibration device of the one or more vibration devices.

4. The virtual reality system of claim 1, wherein the floor mat includes an interior region having a first surface texture and a surrounding region having a second surface texture that differs from the first surface texture.

5. A head-mounted display device, comprising:
one or more output devices including a near-eye graphical display;
one or more input devices including a camera; and
a computing device programmed with instructions executable by the computing device to:
receive image data from the camera;
detect a presence of one or more physical features of a floor mat for use with a session of the virtual reality system by applying one or more machine vision algorithms to the image data, the one or more machine vision algorithms previously trained using supervised machine learning with training images of the one or more physical features as training input;
retrieve profile data for the floor mat from a data storage device based on an identity of the floor mat indicated by the one or more physical features;
define an activity region within a physical environment based, at least in part, on the profile data for the floor mat;
identify a positioning of a physical subject within the physical environment relative to the activity region based on input data received via the one or more input devices; and
selectively augment a virtual reality experience provided via the one or more output devices of the head-mounted display device based on the positioning of the physical subject identified relative to the activity region.

6. The head-mounted display device of claim 5, wherein the activity region is defined in relation to the one or more physical features of the floor mat.

7. The head-mounted display device of claim 5, wherein the one or more physical features include one or more fiduciary markers.

8. The head-mounted display device of claim 7, wherein the one or more fiduciary markers physically define a boundary of the activity region.

9. The head-mounted display device of claim 7, wherein a machine-vision-readable code of the one or more fiduciary markers indicates the identity of the floor mat.

10. The head-mounted display device of claim 5, wherein the virtual reality experience is selectively augmented by outputting one or more of a visual notification, an auditory notification, or a haptic notification via an output device of the one or more output devices.

11. The head-mounted display device of claim 10, wherein the one or more notifications are output responsive to the physical subject being within a threshold proximity of a boundary of the activity region or being outside of the activity region.

12. The head-mounted display device of claim 5, wherein the positioning of the physical subject relative to the activity region is identified based at least in part on the image data and/or subsequent image data received via the camera.

13. The head-mounted display device of claim 5, wherein the one or more input devices of the head-mounted display device further includes one or more spatial positioning sensors; and
wherein the positioning of the physical subject relative to the activity region is identified based at least in part on positioning data received from the one or more spatial positioning sensors.

14. A virtual reality method performed by a computing system of a virtual reality system, the method comprising:
receiving input data via an input device of the virtual reality system;
identifying one or more physical features of a floor mat for use with a session of the virtual reality system based on the input data;
defining an activity region within a physical environment for one or more sessions of the virtual reality system based, at least in part, on the identified one or more physical features of the floor mat;
identifying a positioning of a physical subject within the physical environment relative to the activity region; and
selectively augmenting a virtual reality experience based on the positioning of the physical subject identified relative to the activity region.

15. The virtual reality method of claim 14, wherein the input data includes user input data that indicates an identity of the floor mat for use with the session; and
wherein the method further comprises:
retrieving profile data for the floor mat from a data storage device based on the identity of the floor mat; and
wherein the activity region is at least partially defined within the physical environment based on the profile data for the floor mat.

16. The virtual reality method of claim 15, wherein the user input data further indicates that the positioning of the physical subject is at a reference location and/or reference orientation indicated by the one or more physical features of the floor mat.

17. The virtual reality method of claim 14, wherein the positioning of the physical subject relative to the activity region is identified based at least in part on the image data received via an optical sensor.

18. The virtual reality method of claim 14, wherein the positioning of the physical subject relative to the activity region is identified based at least in part on positioning data received from one or more spatial positioning sensors.

19. The virtual reality method of claim 14, wherein the input data includes image data captured via an optical sensor, and wherein the one or more physical features are identified by applying one or more machine vision algorithms to the image data, the one or more machine vision algorithms previously trained using supervised machine learning with training images of the one or more physical features as training input.

20. The virtual reality method of claim 14, further comprising retrieving profile data for the floor mat from a data storage device based on an identity of the floor mat indicated by the one or more physical features; and
wherein the activity region is at least partially defined within the physical environment based on the profile data for the floor mat.

* * * * *